US008673377B2

(12) United States Patent
Van Eijk et al.

(10) Patent No.: US 8,673,377 B2
(45) Date of Patent: Mar. 18, 2014

(54) METHOD FOR EXTENDING MOLD-FREE SHELF LIFE AND IMPROVING FLAVOR CHARACTERISTICS OF BAKED GOODS

(75) Inventors: Johannes Van Eijk, Longeuil (CA); Clifford Caron, Ormstown (CA); J. Kevin Kraus, Tenafly, NJ (US)

(73) Assignee: Lallemand, Inc., Montreal, Quebec (CA)

( * ) Notice: Subject to any disclaimer, the term of this patent is extended or adjusted under 35 U.S.C. 154(b) by 246 days.

(21) Appl. No.: 12/864,956

(22) PCT Filed: Jan. 28, 2009

(86) PCT No.: PCT/US2009/032240
§ 371 (c)(1),
(2), (4) Date: Apr. 28, 2011

(87) PCT Pub. No.: WO2009/097333
PCT Pub. Date: Aug. 6, 2009

(65) Prior Publication Data
US 2012/0156326 A1     Jun. 21, 2012

Related U.S. Application Data

(60) Provisional application No. 61/023,968, filed on Jan. 28, 2008, provisional application No. 61/023,959, filed on Jan. 28, 2008.

(51) Int. Cl.
*A21D 15/00* (2006.01)

(52) U.S. Cl.
USPC .................................................. 426/8; 426/62

(58) Field of Classification Search
USPC ........................................................ 426/8, 62
See application file for complete search history.

(56) References Cited

U.S. PATENT DOCUMENTS

| | | | |
|---|---|---|---|
| 2,987,403 | A | 6/1961 | Tupper |
| 3,900,570 | A | 8/1975 | Stigler |
| 3,996,386 | A * | 12/1976 | Malkki et al. .................. 426/321 |
| 4,416,904 | A | 11/1983 | Shannon |
| 4,996,062 | A | 2/1991 | Lehtonen et al. |
| 6,123,973 | A | 9/2000 | Kuhn |
| 6,835,397 | B2 | 12/2004 | Lee et al. |
| 7,198,810 | B2 | 4/2007 | Imura et al. |
| 2005/0136166 | A1 | 6/2005 | de Levita et al. |
| 2006/0165857 | A1 | 7/2006 | Williams et al. |
| 2007/0207981 | A1 * | 9/2007 | Almenar et al. ................. 514/58 |
| 2007/0269553 | A1 | 11/2007 | Le et al. |

FOREIGN PATENT DOCUMENTS

| | | |
|---|---|---|
| CN | 1113413 A | 12/1995 |
| JP | 47-037549 A | 12/1972 |
| JP | 02-261380 A | 10/1990 |
| JP | 06-046809 A | 2/1994 |
| JP | 62-143673 A | 8/1994 |
| JP | 07-255443 A | 10/1995 |
| JP | 2725667 B2 | 3/1998 |
| JP | 2002-142739 A | 5/2002 |
| JP | 2006-197809 A | 8/2006 |
| WO | 94/00019 A1 | 1/1994 |

OTHER PUBLICATIONS

Torner, M. J. et al. 1992. Headspace flavor compounds produced by yeasts and *Lactobacilli* during fermentation of preferments and bread doughs. Int. J. Fd. Microbiol. 15:145-152 (Abstract).*
Legan, J. D. et al. 1991. Yeast spoilage of bakery products and ingredients. J. Appl. Bacteriol. 70: 361-371.*
Romkes et al., Some Factors Which Affect Amino Acid Uptake by*Saccharomyces carlsbergensis*. Appl Microbiol. May 1971;21(5):799-805.
Alemnar et al., Release of acetaldehyde from beta-cyclodextrins inhibits postharvest decay fungi in vitro. J Agric Food Chem. Aug. 22, 2007;55(17):7205-12. Epub Jul. 21, 2007.
International Search Report and Written Opinion mailed Sep. 11, 2009 for Application No. PCT/US2009/032240 (10 Pages).
International Preliminary Reoprt on Patentability mailed May 14, 2010 for Application No. PCT/US2009/032240 (4 Pages).
Maarse, H., ed., Volatile Compounds in Food and Beverages. 1991, 1st Edition, Marcel Dekker, Inc., New York.
Utama et al., In vitro efficacy of plant volatiles for inhibiting the growth of fruit and vegetable decay microorganisms. J Agric Food Chem. Oct. 23, 2002;50(22):6371-7.
Japanese Office Action for Application No. 2010-544477, issued Apr. 2, 2013. (8 pages).
Tanaka et al., Chemistry of Bread Production (1 ), Chemistry of Bread Producing Processes, Kourin K. K., Oct. 30, 1997, 2nd Ed. p. 263-271.
Australian Office Action for application No. 2009209259, issued Jun. 14, 2013. (4 pages).
Jeffers, Preparing alcohol by fermentation. Modular Laboratory Program in Chemistry. 2000;16 pages. Retrieved from the internet on May 1, 2013. <URL:http://slider-chemistry-12.wikispaces.com/file/view/Ethanol+Prac.pdf>.

* cited by examiner

*Primary Examiner* — D. Lawrence Tarazano
*Assistant Examiner* — Hamid R Badr
(74) *Attorney, Agent, or Firm* — Nutter McClennen & Fish LLP

(57) ABSTRACT

The present invention provides a novel method for extending mold-free shelf life and for improving the flavor of baked goods by applying live yeast on the surface of the baked good after baking and cooling before packaging the baked good in closed bags and storing the packaged baked goods at ambient temperature. This method can be used for all kinds of baked goods including breads, rolls, bagels, pizza crusts, wheat flour tortillas, croissants, cakes, muffins, donuts and pita breads. This method can also be used to produce baked goods containing live probiotic yeast (*Saccharomyces cerevisiae* var. *boulardii* ).

58 Claims, No Drawings

METHOD FOR EXTENDING MOLD-FREE SHELF LIFE AND IMPROVING FLAVOR CHARACTERISTICS OF BAKED GOODS

CROSS-REFERENCE TO RELATED APPLICATIONS

This application claims priority to U.S. Provisional patent application Ser. Nos. 61/023,968 and 61/023,959, both filed Jan. 28, 2008. All related applications are incorporated herein by reference in their entirety.

FIELD OF INVENTION

The present invention relates to a novel method for extending the mold-free shelf life and the probiotic characteristics of packaged baked goods. The invention also relates to a method for improving the taste and flavor of baked goods and also for preserving a desirable flavor of packaged baked goods. The present invention also relates to baked goods produced using the method according to the present invention.

BACKGROUND OF THE INVENTION

The shelf life of baked goods is mostly dependant on the rate of microbial spoilage. Both the characteristics of the food product itself, such as water activity ($A_w$), pH, redox potential, antimicrobial agents (preservatives), the chemical and biological composition of the baked good, as well as the environment in which it is stored (temperature, humidity and the gas composition of the package) affect the type and rate of microbial spoilage. Since baking of bread in an oven will kill all microorganisms with the exception of some spore forming bacteria, the contamination of bread by air-born mold spores after baking, during cooling and/or slicing of bread is the main source of microbial contamination. Furthermore, because most yeast raised baked goods such as bread, rolls, bagels, wheat flour tortillas, pizza crusts, donuts, croissants and pita breads are characterized by a relatively low water activity and a pH of around 5.0, mold is the main microorganism that causes spoilage of bread.

Traditionally, artificial additives have been added to baked goods to extend their shelf life. Currently, organic acids and their salts like calcium propionate are the main additives used for retarding molding of bread and bread-like products. Examples of the use of compounds such as propionates, sorbates and benzoates in baked goods to extend the shelf life of baked goods is well established in the art (See, e.g., U.S. Pat. Nos. 3,900,570, 4,416,904 and 6,123,973). Although propionates and related compounds are effective in retarding mold growth thereby extending the shelf life of the baked goods in which they are used, there are important limitations and disadvantages of using this chemical preservative.

First, even relatively low levels of these compounds can cause an undesirable off-taste, off-flavor, or off-smell. As one of skill in the art will appreciate, taste usually refers to the basic taste perceptions observed by the taste buds on the tongue, i.e., salt, sweet, bitter, acid and umami. Likewise, aroma refers to the perception from smelling a product with the many different receptors in our nose when the air containing volatile flavor compounds passes through our nose. When a food is eaten, a combination of taste and aroma is perceived. The combination of taste and aroma is perceived as flavor. This perception can be compared with that of a reference product. If the taste is different from expectations, e.g., too bitter, too salty, too acid, then the food can be described as having an off-taste. If the aroma is different from expectations, then the food can be described as having an off-smell. The combination of an off-taste or an off-smell can be described as off-flavor. If the food lacks sufficient taste or flavor, it can be described as bland.

Second, propionates not only inhibit the activity of yeast used for dough leavening, but also reduce the gas retaining capacity of dough resulting in lower loaf volume and an inferior crumb structure. Third, many countries limit the amount of propionate that can be used in baked goods. Finally, propionates are considered artificial chemicals and have been found less desirable by consumers as additives in bread with mainly natural label-friendly ingredients. While other chemical preservatives like sulfites, benzoates, sorbates, methyl and propyl parabens have also been used to some extent in baked goods, they are either less effective than propionates, interfere with the process of dough making, such as sorbates or sulfites that react during mixing with the disulfide bridges in the gluten protein structure, or their use is limited by regulation to baked goods other than bread.

Several attempts to overcome some of the limitations of using propionates and other chemical preservatives have been made by treating the surface of a baked good with a spray containing a preservative rather than incorporating it into the dough (see Pyler, Baking Science & Technology Vol I page 231, 1988 ISBN 0-929005-00-7). However, such methods have never found widespread usage because of the inherent difficulty in completely covering the surface of the baked good. Gaps in the coating provide areas where mold growth can still occur uninhibited. In addition to chemical preservatives, germicidal ultraviolet rays have been used for combating the molding problem in baked goods. However, this method is usually not sufficient to extend the mold-free shelf life of baked goods beyond the time for which such products are normally kept and requires considerable capital investments.

Modified atmospheric packaging (MAP) where the baked good is stored in special package with a low oxygen atmosphere has been the main alternative to extend mold-free shelf life without the use of chemical preservatives. However this method tends to be too expensive for most baked goods because it requires special packaging and special equipment for removing the oxygen from the baked good. The process works by (repeatedly) applying vacuum and flushing the packaged baked good with inert gasses like nitrogen and carbon dioxide gas to remove almost all of the oxygen remaining in the baked product. Among other disadvantages, this method cannot easily be used on high speed lines like bread lines without considerably reducing line speed and output.

Another known method for extending shelf life of food products including bread is the application of a glucose oxidase/catalase enzyme preparation on a food product stored in a sealed package in quantities high enough to reduce the level of oxygen in the package to under 1% within 5 days. (See, U.S. Pat. No. 4,996,062). A major disadvantage of this method is the high quantities of glucose oxidase required which makes the process cost-prohibitive from a commercial standpoint and can cause inhalation allergies when applied by spraying. The process also requires special packaging with low oxygen permeability to maintain a low level of residual oxygen in the package.

A further method and packaging for protecting food products from mold and oxidation is disclosed in U.S. Pat. No. 2,987,403. This method includes inoculating the food with an aerobic organism like yeast and sealing said food product in an oxygen impermeable enclosure like a can, tin jar or wrap. This reference does not disclose the application of the process to baked goods like bread and requires special packaging with low oxygen permeability unlike the conventional plastic polyethylene bags used to package bread and other baked goods. In general, low residual oxygen levels below 1% are required for stopping mold growth which can only be achieved by powerful oxygen absorbers in combination with special packaging to maintain a low level of residual oxygen in the packaged food product.

Another method for retarding mold growth is disclosed in U.S. Pat. No. 7,198,810. This reference discloses the use of a special yeast strain and/or process to increase the level of ethanol in dough (and the resulting bread) to a high level (0.8%-1.5%) as a means to retard mold growth. While high levels of alcohol in bread may help to retard mold growth, this method is difficult to implement since it requires major changes in process and recipe that will affect bread quality and will increase production costs substantially. Moreover, the gain in mold-free shelf life obtained by this method is relatively small.

The inoculation of microorganisms into baked goods is also known in the art. PCT Pub. No. WO 94/0019, for example, describes a method for adding live microorganisms with a potential health benefit to baked goods by injecting viable microorganisms, in particular probiotic lactic acid bacteria, in a protective matrix into the baked good. U.S. Pat. No. 6,835,397 discloses the protection and controlled release of fragile bioactive compounds including probiotic lactic acid bacteria and yeast for use in food and feed applications. Both references indicate the fragility of probiotic microorganisms in a food or feed product and the need to protect their viability not only during processing but also during subsequent storage of such a food or feed product.

Apart from molding there are other undesirable changes associated with bread staling occurring during storage of bread and other baked goods. During prolonged storage bread crumb becomes firmer while the freshly baked bread flavor gradually disappears. The introduction and increased usage of shelf life extending enzymes based on maltogenic amylase has greatly contributed to a solution for the crumb firming problem which has resulted in an increased need for more effective solutions to prevent molding and the loss of bread flavor. When bread is stored in conventional polyethylene plastic bags, much of the fermentation flavor will slowly dissipate through the plastic bag and disappear resulting in a bland flavor unless special packaging is used to prevent the loss of volatile compounds produced by yeast fermentation and by Maillard browning reactions during baking. While numerous patents disclose methods or compositions for improving and boosting the taste and flavor of freshly baked bread, these methods and compositions are normally not effective in preventing the loss of volatile flavor compounds during storage of bread. Consequently a great need exists for better and more cost-effective methods for preventing mold growth and counteracting the loss of freshly baked bread flavor during storage.

Many naturally occurring volatiles including acetaldehyde produced by yeast from ethanol in the presence of oxygen are known to have antifungal and antibacterial properties. The efficacy of plant volatiles including acetaldehyde for inhibiting the growth of decay microorganisms including molds has been reported by Made S.et al (J. Agric. Food Chem. 2002, 50, 6371-6377). However acetaldehyde is of limited use for this purpose because of its high volatility causing it to diffuse rapidly into the air. Almenar E. et al (J. Agric. Food Chem. 2007, 55(17), 7205-7212) describe an effective system to inhibit post harvest decay fungi based on a slow and controlled release of acetaldehyde from beta-cyclodextrins. An effective anti-molding system based on a slow release system to continously generate acetaldehyde is therefore be of considerable interest.

SUMMARY OF THE INVENTION

The instant invention relates to a method of extending the mold free shelf life of baked goods comprising the addition of live yeast to the baked good or packaging material used for the baked goods as well as baked goods prepared using the method of the invention.

More specifically, in one aspect, the instant invention relates to a process for producing a baked good with extended mold-free shelf life comprising the steps of baking said baked good and cooling said baked good to a temperature sufficiently low for yeast to survive; applying live yeast to said baked good after baking; and packaging and storing said baked good in a closed bag.

In one aspect, the number of days of mold free shelf life is at least 15 days. In another aspect, the number of days of mold free shelf life is between 15 days and 25 days. In yet another aspect, the number of days of mold free shelf life is greater than 25 days. In a further aspect, the number of days of mold free shelf life is greater than 35 days. In another aspect the number of days of mold free shelf life is greater than 40 days.

In another aspect, the instant invention relates to a process for producing a baked good with improved flavor comprising the steps of: baking said baked good and cooling said baked good to a temperature sufficiently low for yeast to survive; applying live yeast to said baked good after baking; packaging and storing said baked good in a closed bag.

In another aspect, the instant invention relates to a process for producing a baked good with extended mold-free shelf life comprising the steps of baking said baked good and cooling said baked good to a temperature sufficiently low for yeast to survive; applying live yeast solution containing sugar fermented by this yeast to said baked good after baking; and packaging and storing said baked good in a closed bag. The baked good of the invention can take various forms. Said baked good include, but are not limited to bread, rolls, pita bread, donuts, croissants, tortillas, bagels and pizza crusts. The baked goods of the invention can be prepared in different ways including being baked in an oven or fried in a fryer. The baked good of the invention can be yeast raised or chemically leavened. In one aspect, the baked goods of the invention are sliced prior to packaging.

In a further aspect of the invention the baked goods of the invention further comprise non-yeast based mold-inhibiting agents. Such mold-inhibiting agents can include any mold-inhibiting agent well known in the art and include, including but not limited to propionate, sorbate, benzoate, paraben and cultured bacteria compounds. In one embodiment the cultured bacteria compounds can be sour dough compounds.

In one aspect of a method of the invention the live yeast material is applied after baking by any number of methods including spraying or brushing a yeast solution on the surface of said baked good, brushing dry yeast onto the surface of said baked good, adsorbing of dry yeast or a liquid yeast solution into or onto the closed bag that comes into contact with the baked good after packaging, injecting of a yeast solution into the baked good, or including the live yeast solution in a separate carrier or support that is included in the closed bag used for packaging the baked good. In an exemplary embodiment the closed bag is a polyethylene plastic bag.

The live yeast may be applied as part of an egg-wash, a chocolate filling or covering, a jelly or cream filling or covering that is applied to said baked good after baking.

In a preferred embodiment of the methods of the invention, live yeast is applied to a baked good preferably as a yeast solution containing 0.01-20 grams of live yeast per 100 ml used in quantities varying from 0.5 to 10 ml per 100 cm$^2$, more preferably as a yeast solution containing 0.1-1 gram of live yeast per 100 ml used in quantities varying from 1.5 to 2.5 ml per 100 cm$^2$.

In a further aspect of the invention, the live yeast includes yeast strains of the genus *Saccharomyces* used as wine, beer, distillers, bakers and probiotic yeast.

The baked goods of the invention can be stored at any conventional temperature wherein the live yeast would maintain viability. In one embodiment the baked good is stored at ambient temperature.

The methods of the invention can be extended beyond baked goods to include feed products and other food products. In another aspect, the invention includes a process for extending the mold-free shelf life of a food or feed product comprising the steps of heat treating said food or feed product as a means to kill substantially all vegetative microbial cells in said food or feed product; applying live yeast solution containing sugar fermented by this yeast to said food or feed product; and packaging and storing said food or feed product in a closed bag.

The invention also comprises baked goods that have been treated by applying live yeast to the baked good after baking. In one embodiment the invention comprises a baked good prepared by applying live yeast after baking in quantities less than 1 billion CFU per 50 gram of said baked good. In another embodiment the invention comprises a baked good prepared by applying live yeast after baking in quantities between 1 million and 1 billion CFU per 50 gram of said baked good. In an exemplary embodiment the yeast is *Saccharomyces cerevisiae* var *boulardii*.

In another aspect the invention comprises a baked good prepared by applying live yeast on the surface of said baked good after baking as a means to improve mold-free shelf life of said baked good, packaging said baked good in a closed bag and storing said baked good at ambient temperature.

In a further aspect the invention comprises a baked good prepared by applying live yeast on the surface of said baked good after baking as a means to improve flavor of said baked good, packaging said baked good in a closed bag and storing said baked good at ambient temperature.

In one embodiment the invention comprises a baked good prepared by applying live yeast after baking to the surface of the baked good in a quantity of more than 1 CFU of yeast per cm$^2$. In one aspect the yeast can be applied in a quantity between 50 CFU and 200 million CFU of yeast per cm$^2$. In another aspect the yeast can be applied in a quantity between 500 and 200 million CFU of yeast per cm$^2$. In yet another aspect aspect the yeast can be applied in a quantity between 150,000 CFU and 2.5 million CFU of yeast per cm$^2$.

In a further embodiment the invention comprises a baked good having a detectable quantity of live yeast on the surface of the baked good present after baking in a quantity of more than 1 CFU of yeast per cm$^2$. In one aspect, the detectable quantity of yeast can be between 50 CFU and 200 million CFU of yeast per cm$^2$. In another aspect, the detectable quantity of yeast can be between 500 CFU and 2 billion CFU of live yeast per cm$^2$. In yet another aspect, the detectable quantity of yeast can be between 5000 and 200 million CFU of yeast per cm$^2$. In still another aspect, the detectable quantity of yeast can be between 15,000 CFU and 2.5 million CFU of live yeast per cm$^2$. In another aspect, the detectable quantity of yeast can be between 150,000 CFU and 2.5 million CFU of yeast per cm$^2$. In an exemplary embodiment the baked good has an extended mold-free shelf-life. In another embodiment the baked good has improved flavor.

In one aspect the baked good of the invention has a surface to which live yeast can been applied in quantities comprising between 5 nanogram and 20 mg of live yeast per cm$^2$. In another aspect, the live yeast can be applied in quantities between 0.5 microgram and 20 mg of live yeast per cm$^2$. In yet another aspect, the live yeast can be applied in quantities between 15 microgram and 0.25 mg of live yeast per cm$^2$.

In a further aspect the invention comprises a baked good having a detectable quantity of live yeast on the surface of the baked good present after baking wherein elevated levels of volatile compounds are present after 1 week of storage at room temperature including ethanol at levels between 0.3 and 0.8% of said baked good, isoamyl alcohol at levels above 25 mg per kg of said baked good, isobutyl alcohol at levels above 10 mg per kg of said baked good and acetaldehyde at levels above 5 mg per kg of baked good.

In a further aspect the invention comprises a method to extend mold-free shelf life of a food or feed product by spraying it with a live yeast solution that also contains ethanol. In a further embodiment the ethanol is produced by the live yeast by fermenting sugar prior to applying the fermented live yeast solution onto the food or feed product and packaging the food or feed product into a closed bag. In a further embodiment the spraying of a solution containing live yeast and ethanol onto a food or feed product prior to packaging is used to extend its mold-free shelf life by acting as an acetaldehyde generating system that inhibits spoilage microorganisms.

In a further aspect the invention comprises a process for producing a food or feed product with extended mold-free shelf-life comprising the steps of preparing a solution of live yeast and sugar and fermenting a substantial part of the sugar into ethanol; applying said fermented live yeast solution to said food or feed product; and packaging and storing said food or feed product in a closed bag In one embodiment of the process, the live yeast solution contains between 1 and 10% yeast and between 10% and 20% sugar and is applied after fermentation in quantities between 0.1% and 10%, more preferably between 0.5% and 2.5% on the food or feed product. In an exemplary embodiment, the live yeast solution contains about 10% by weight of ethanol after fermentation. In another embodiment, the live yeast solution contains about 5% by weight of ethanol after fermentation. In yet another embodiment, the live yeast solution contains between about 5% and 10% by weight of ethanol. In other embodiments the live yeast solution can contain between 6% and 10% by weight of ethanol, between 7% and 10% by weight of ethanol, between 8% and 10% by weight of ethanol, or between 9% and 10% by weight of ethanol In another aspect, the invention comprises an acetaldehyde generating product for inhibiting food and feed spoilage microorganisms comprising preparing a solution of live yeast and sugar and fermenting a substantial part of the sugar into ethanol; applying said fermented live yeast solution to said food or feed product; and packaging and storing said food or feed product in an enclosure.

In one embodiment, the live yeast solution applied to the product contains between 1 and 10% yeast and between 10 and 20% sugar and is applied after fermentation in quantities between 0.1 and 10%, or in another aspect, between 0.5 and 2.5% on the food or feed product.

In another aspect, the invention comprises an improved production line for producing a baked good of the type including an oven, a cooler, a slicer, and a bagger. In one exemplary embodiment the improvement comprises a sprayer for applying a solution of live yeast onto a baked good. In another aspect, the invention comprises an improved method for producing a baked good on a production line. In one embodiment, the improvement comprises spraying the solution of live yeast onto the baked good before the baked good enters the slicer. In another embodiment, the improvement comprises spraying the solution of live yeast onto the baked good before the baked good enters the bagger.

In another aspect, the invention comprises a composition for extending mold-free shelf life of a baked good comprising live yeast, wherein the composition is a solution and is applied on the surface of the baked good. In another aspect, the invention comprises a composition for extending mold-free shelf life of a baked good comprising live yeast and ethanol, wherein the composition is a solution and is applied on the surface of the baked good. In one embodiment, the composition contains between 1% and 10% by weight of yeast. In an exemplary embodiment, the composition contains about 10% by weight of ethanol. In another embodiment, the composition contains about 5% by weight of ethanol. In yet another embodiment, the composition contains between about 5% and 10% by weight of ethanol. In other embodiments the composition can contain between 6% and 10% by weight of ethanol, between 7% and 10% by weight of ethanol, between 8% and 10% by weight of ethanol, or between 9% and 10% by weight of ethanol. In yet another embodiment the composition can applied on the baked good in quantities between 0.1% and 10% by weight of the baked good, or in another aspect, between 0.5% and 2.5% by weight of the baked good.

DETAILED DESCRIPTION OF THE INVENTION

The main object of this invention is to provide an effective method for inhibiting the growth of mold during storage of baked goods such as bread, rolls, bagels, pizza crusts, wheat flour tortillas, cakes and muffins, croissants, donuts and pita bread without loss of quality. A further object and advantage of this invention is to accomplish this in a cost-effective manner without the use of special packaging, large capital expenditures or complicated changes in the process and recipe of these baked goods. Another object and advantage of this invention is to improve the taste and flavor of baked goods and to preserve an attractive flavor profile during the period these baked goods are normally stored. Further objects and advantages of this invention will become apparent from the detailed description of the invention.

The present invention provides a novel method for inhibiting the growth of molds in baked goods such as bread, rolls, bagels, pizza crusts, wheat flour tortillas, croissants, donut, pita breads, cakes and muffins. The present invention also provides a method for improving the flavor of these baked goods and for preserving this flavor during subsequent storage of these baked goods in closed bags. Surprisingly it was found that these results could be obtained by applying live yeast cells on the surface of the baked good after baking. Another aspect of the present invention is to provide a method for producing a baked good with extended mold-free shelf life and an improved fermentation flavor during storage by post baking application of live yeast. The present invention may be used to provide extended mold-free storage in any storage enclosure. For example, storage in bags, bins, silos, rail cars, or other storage enclosures.

The present invention may be used to preserve a wide variety of feed and food products, but is especially suited for yeast raised baked goods including bread, rolls bagels, pizza crusts, croissants, wheat flour tortillas and pita breads. These baked goods are produced by mixing wheat flour, water, salt, yeast and other ingredients into a dough that is divided and shaped into smaller units which are fermented and proofed, baked in an oven and cooled to ambient temperature before being (sliced and) packaged into closed bags. The present invention will extend the shelf life of these yeast raised baked goods by retarding mold growth and counteracting flavor loss during storage. The present invention may be used to replace chemical preservatives like propionates, sorbates, benzoates or parabens, but can also be used to further extend mold-free shelf life of baked goods that already contain an added mold-inhibiting agent.

The present invention includes the addition of live yeast to the baked good after baking but before packaging the baked good into a closed bag. The term "live yeast" refers to yeast that is capable of both anaerobic fermentation of sugars into alcohol and carbon dioxide gas and aerobic metabolism of sugars thereby consuming oxygen. Such live yeast cells can be enumerated as CFU (colony forming units) on petri dishes containing a yeast selective agar medium (YEP+chloroamphenicol). Many yeast strains may be used in the present invention including yeast strains of the genus *Saccharomyces* like wine and beer yeast strains, bakers yeast strains (*Saccharomyces cerevisiae*) and probiotic yeast strains (*Saccharomyces cerevisiae* var. *boulardii*). Most commercially available yeast is not a pure culture and may contain small amounts of lactic acid bacteria which do not affect results when used in the present invention. Both fresh yeast (block, bag or cream yeast) and dry yeast (instant dry yeast or active dry yeast) can be used.

The live yeast cells can be added in various ways. For example, live yeast cells can be applied by brushing or spraying a live yeast containing solution onto the surface of a baked good. Alternatively the solution of live yeast can be injected into the baked good or sprayed onto the bag that comes into contact with the surface of the baked good after packaging. Another method to put the live yeast in contact with the surface of the baked good is to use dry instant yeast that has been ground into a fine powder that can be brushed onto the surface of the baked good or (electrostaticly) adsorbed onto the bag used for packaging the baked good. So the yeast can be applied either as a liquid yeast solution or as dry yeast that is applied either onto the surface of the baked good or onto the bag that is used for packaging the baked good and comes into contact with the surface of the packaged baked good (active or activated packaging). The live yeast can also be included separately from the baked good in the bag, e.g. in the form of a bread slice that is sprayed with a solution of live yeast cells or in the form of bread crumbs that have been sprayed with a solution of live yeast cells. Spraying onto the surface of the baked good is the preferred method since it can easily be implemented in most large bakeries that often already have suitable spraying equipment. The excess liquid in the live yeast containing solution will be rapidly absorbed by the dry surface of the freshly baked good. The live yeast containing solution may contain other ingredients than water, including stabilizers or the types of ingredients that are used in egg washes or icings used for decorative purposes. Alternatively, the live yeast can be incorporated into the baked good as a cream (e.g. cream puffs), as a jelly (e.g. jelly donuts) or as a chocolate filling (croissants).

Since it is important for the present invention that the yeast is alive and remains alive when applied in or onto the baked good, it is preferred that the yeast containing solution is kept refrigerated and applied to a baked good that is not too hot. Yeast is most stable at refrigerator temperatures but will be rapidly inactivated at temperatures above 125 F. Therefore it is preferred to apply live yeast that is refrigerated into or onto the baked good after the product has been cooled down to ambient temperature. A person skilled in the art and science of baking will be able to determine when the baked good has been cooled down sufficiently to avoid killing the yeast when applying the live yeast to the baked good. The preferred method of applying the live yeast is by spraying a refrigerated yeast solution onto the surface of a baked good in amounts of 0.5-10 ml per 100 $cm^2$, more preferably 1.5-2.5 ml per 100 $cm^2$, while the yeast solution contains between 0.01 and 20 gram, more preferably between 0.1 and 1 gram of either compressed or instant dry yeast per 100 ml water. Since regular yeast contains between 10 (compressed yeast) and 30 billion CFU per gram, this will be approximately equivalent to applying between 5000 CFU (0.5 microgram yeast) and 200 million CFU (20 mg yeast) per $cm^2$, more preferably between 150,000 CFU (15 microgram yeast) and 2.5 million CFU (250 microgram yeast) per $cm^2$.

Before or after the live yeast cells have been applied into or onto the baked good according to this invention, it may be sliced (in case of bread, buns and rolls) before it is packaged into a closed bag and stored at ambient temperature. The term "ambient temperature" refers to the temperature of the surroundings in which baked goods are normally kept for distribution and storage by the producer, distributor and consumer which in most cases is room temperature. The terms "bag" and "closed bag" refer to the bags that are normally used for packaging baked goods like breads such as plastic bags, cover foil bags, coated paper bags, or other impermeable or semipermeable bags. Plastic bags used for packaging baked goods are often made from LDPE (low density polyethylene) and are normally closed by plastic tie wraps or "Kwik-Loc" plastic closures. These bags have only moderate barrier properties against the passage of gasses and vapors and are different from the high barrier plastic bags that are used for modified atmospheric packaging (MAP).

Surprisingly it was found that during ambient storage of baked goods in closed bags produced according to this invention, mold growth is retarded and an attractive fermentation flavor develops that is associated with freshly baked bread. Normally the fermentation flavor of freshly baked bread packaged in a commonly used polyethylene bag will gradually disappear because the bag allows these volatile flavor compounds to escape. During storage of bread made according to this invention an increase is noticed in the level of volatile flavor compounds while the levels of flavor compounds in the bag such as ethanol, acetaldehyde, isoamyl alcohol and isobutyl alcohol increase as can be determined by headspace Gas Chromatography or by using a NexxTech breath alcohol analyzer. Thus the development of a fermentation flavor by live yeast during storage of bread produced according to this invention compensates for the normal loss of this type of flavor. Surprisingly, the increased mold-free shelf life of the baked goods packaged in normal polyethylene bags produced according to this invention cannot be explained by low residual oxygen content in the closed bag. When using a Mocon Pac Check™ Head Space Analyzer to determine residual oxygen in the head space of the polyethylene bag used for storage of baked goods, only small differences were found in the oxygen content in the head space while the residual oxygen content in the head space of the bag with both regular and live yeast treated bread remained high (>17% oxygen vs. 20.7% oxygen in normal air). Moreover it was found that the anti-molding effect of this invention wasn't lost after opening and closing the bag or after repackaging the baked good in a new bag. This suggests that retarding of mold growth in the bread according to this invention cannot be explained from the depletion of oxygen in the head space of the bag by live yeast resulting in a low oxygen content similar as in modified atmospheric packaging (MAP) where high barrier plastic is used and residual oxygen in the bag is normally kept at around 1%.

Another surprising finding was that the anti-molding effect obtained using the method of this invention does not depend on totally covering the baked goods with live yeast, which would be difficult to achieve in practice. It was found that when a loaf of bread sprayed with live yeast and a untreated loaf of bread where packaged together in one and the same closed bag, both loaves showed the same extended mold-free shelf life during subsequent storage. However, if bread sprayed with live yeast was not packaged but only covered by plastic for the duration of the storage period, the anti-molding effect was lost. These results suggest that the anti-molding effect according to this invention is related to the volatile compounds produced by the live yeast applied after baking. These volatile compounds will easily redistribute over the whole loaf of bread through the atmosphere of the closed bag as can be noticed for the flavor compounds in the breads produced according to this invention.

The present invention can be incorporated into a production line. One of skill in the art will appreciate that there are countless variations in equipment, process and recipe by which baked goods can be produced. A basic manufacturing line for wholesale bread of a type well known in the art can include various types of equipment connected by conveyer belts. By way of non-limiting example, the manufacturing line can include a mixer to mix all ingredients together into a well-developed dough; a divider/rounder/overhead proofer to divide the dough into uniform pieces by weight, round the dough into balls, and then ferment the dough balls for a short time to relax the dough prior to moulding; a moulder to transform the dough balls into a cylindrical shape before the dough is placed into a baking pan; a proofer to increase the volume of the dough in the pan by yeast converting sugar into carbon dioxide gas; an oven at high temperature where the dough expands and is baked into bread of acceptable size; a cooler where the baked bread is cooled down, e.g., for one hour before slicing; and a slicer/bagger where the bread is sliced and put into closed bags.

In one embodiment, the live yeast solution of the present invention can be applied to a baked good by conventional spraying equipment. Such equipment can apply a solution of live yeast (usually 2-5 ml of a 1% yeast solution per each 1.5 lb loaf of bread). For example, the spraying equipment can include a pump to transfer the yeast solution to spraying nozzles and an air compressor to finely disperse the yeast solution when it passes through the nozzles. The nozzles can be mounted on a spraying bar and can be adjusted in direction, volume, etc to obtain the desired spraying pattern. The nozzles can also be electronically controlled to spray only when bread passes under the nozzles. The spraying equipment can be integrated into the production line or can be mobile by using a cantilever that can be placed over the conveyer belt of the production line. In a preferred embodiment, the bread is sprayed with the live yeast solution after it has come out of the cooler before it goes through the slicer. In an alternate embodiment the bread can be sprayed with the live yeast solution between the slicer and the bagger.

The present invention will be more fully illustrated in the EXAMPLES which follow.

EXAMPLE 1

Bread was prepared using a no-time straight dough method by mixing together flour (100%), water (63%), canola oil (2.5%), sugar (7%), Eagle block yeast (3.5%), salt (2%), improvers (1.5% Fermaid XTR+0.25% Essential SOFT VI-NS) and calcium propionate (0% or 0.5%). The ingredients were mixed in a Kemper spiral mixer (2 min low speed, 10 minutes high speed) into a dough (25 degrees Celsius) that was given a floor time of 15 minutes before being divided into 450 gram dough pieces which after 7 minutes bench time were rounded and moulded into a cylindrical shape, panned and proofed to height (during 55-65 minutes) in a proof box set at 112 F/88% RH before being baked in a National oven during 17 minutes at 440 F. After baking the loaves (of approximately 375 grams) were cooled at ambient temperature for one hour to a temperature of 25 -30 degrees Celsius. Loaf volume was measured in a loaf volume meter using a rapeseed displacement procedure that was also used to obtain a reproducible infection with bread molds. Some of the loaves were sprayed with solutions of live microorganisms in water using a spray bottle. All loaves were sliced (within 3 -5 minutes after spraying) and put into a plastic polyethylene bag which was closed by a tie wrap. The breads were stored at room temperature (22 degrees Celsius) and evaluated for mold growth by evaluating 5-10 loaves during over a 4 week period.

The solutions containing live microorganisms were prepared as follows: 1 gram of instant dry yeast or freeze dried lactic acid bacteria was slowly wetted by 100 ml of luke warm (100 F). After 10 minutes the solution was stirred to completely dissolve and homogenize the solution which was subsequently cooled down on ice to refrigerator temperature. In case of compressed yeast, 1 gram of block or bag yeast was dissolved in 100 ml of ice-cold water. The solutions of live microorganisms were put in a spray bottle and 3-5 ml (5 shots) of these solutions was sprayed on the top of the bread covering a surface of about 200 cm$^2$ The results are shown in next table (Table 1). These results show that all yeast samples and different strains tested (bakers, wine and beer yeasts and probiotic *Saccharomyces cerevisiae* var. *boulardii* yeast) increased mold-free shelf life, while freeze dried samples of pure lactic acid bacteria had no effect. The results also show that a pure culture of the compressed yeast (grown under aseptic conditions on molasses and obtained by centrifugation) was as effective as commercial yeast samples that may contain low amounts of lactic acid bacteria. The results indicate that the yeast was as effective in increasing mold-free shelf life of bread as calcium propionate added at 0.5%, while using 0.5% calcium propionate in combination with a live yeast spray further increases mold-free shelf life to such an extent that molding of bread was prevented over a period of more than 42 days. After 42 days, it was found that bread, even when packaged in a plastic bag, tends to dry out so that mold no longer grows.

TABLE 1

Mold-free shelf life of bread coated with microorganism solutions

| Recipe | Spray (of live yeast or bacteria) | Time for mold spots on >50% of loaves |
| --- | --- | --- |
| Control | None | 8-9 days |
| 0.5% Ca-propionate | None | 19 days |
| Control | Lactobacillus plantarum | 8-9 days |
| Control | Pediococcus acidolactici | 8-9 days |
| Control | Lactococcis lactis | 8-9 days |
| Control | Lactobacillus brevis | 8-9 days |
| Control | Lactobacillus acidophilus | 8-9 days |
| Control | Lactobacillus reuteri | 8-9 days |

TABLE 1-continued

Mold-free shelf life of bread coated with microorganism solutions

| Recipe | Spray (of live yeast or bacteria) | Time for mold spots on >50% of loaves |
| --- | --- | --- |
| Control | Bifodobacterium longum | 8-9 days |
| Control | Eagle block yeast | 20 days |
| Control | Eagle block yeast (pure culture) | 20-22 days |
| 0.5% Ca-propionate | Eagle block yeast | >42 days |
| Control | Instaferm instant yeast | 20-22 days |
| Control | Eagle gold instant yeast | 20-22 days |
| Control | Packarnya red instant yeast | 20-22 days |
| Control | Packmaya gold instant Yeast | 20-22 days |
| Control | Fermipan red instant yeast | 20-22 days |
| Control | Fermipan brown instant yeast | 20-22 days |
| Control | SAF red instant yeast | 20-22 days |
| Control | SAF gold instant yeast | 20-22 days |
| Control | Fleishmann red instant yeast | 20-22 days |
| Control | Akmaya red instant yeast | 20-22 days |
| Control | Angel red instant yeast | 20-22 days |
| Control | Nottingham beer yeast | 20-22 days |
| Control | Windsor beer yeast | 20-22 days |
| Control | Lalvin 71B wine yeast | 20-22 days |
| Control | Levucell SB (*S. cerevisiae* var *boulardii*) | 20-22 days |

EXAMPLE 2

Wheat flour tortillas were prepared by mixing flour (100%), water (60%), shortening (10%), salt (2%), sugar (1%), improver (1% Fermaid FLB), SSL (0.3%) and baking powder (3%) into a dough (30 degrees Celsius) that was divided into 55 gram dough pieces that were rested for 12 minutes before being pressed into a tortilla shape of about 20 cm in diameter and baked on both sides using a household tortilla hot press and oven set at 200 degrees Celsius. Ten tortillas were stacked and put into a closed Ziplock bag. Some of the tortilla stacks were sprayed with 3-5 cc of a solution of 1 gram of Eagle block yeast in 100 ml of ice-cold water prior to packaging. Some other tortillas were sprayed with a live yeast solution containing 2.5% yeast and 20% sucrose that had been fermented for 24 hours at 30 degrees Celsius to produce alcohol. The packaged tortillas were stored for up to 3 weeks at ambient temperature and evaluated for mold spots.

Sponge cakes were prepared by foaming a batter of chlorinated cake flour (100%), sugar (130%), salt (2.5%), whey powder (10%), baking powder (4%), whole eggs (140%), egg yolks (20%), water (25%), vanilla powder (1.25%) in a KitchenAid blender at the highest speed for 10 minutes using the wire attachment. The foamed batter (0.5-0.6 cc/gram) was scaled (450 grams) into a circular cake pan (18 inch diameter) and baked in a National oven for 45 minutes at 375 degrees F. After the cakes had cooled down some were sprayed with 3-5 cc of a solution of 1 gram of Eagle block yeast in 100 ml of ice-cold water prior to packaging the cakes into a closed plastic bag. Some other cakes were sprayed with a live yeast solution containing 2.5% yeast and 20% sucrose that had been fermented for 24 hours at 30 degrees Celsius to produce alcohol.

Cake muffins were prepared by preparing a batter of chlorinated cake flour (75 grams), bread flour (175 grams), margarine (250 grams), salt (5 grams), eggs (250 grams), sugar (250 grams), milks (65 grams) and baking powder (8.5 grams) in a KitchenAid blender using the paddle attachment. The cups were placed in the muffin pan and filled with 75 gram batter and baked for 16 minutes at 410 F in a National oven. After the baked muffins had cooled down some muffins were sprayed on top of each muffin with 0.5-1 cc ml of a solution of 1 gram of Eagle block yeast in 100 ml of ice-cold water prior to packaging the muffins into a closed plastic bag. Some other muffins were sprayed prior to packaging with a 0.5-1 cc of a live yeast solution containing 2.5% yeast and 20% sucrose that had been fermented for 24 hours at 30 degrees Celsius to produce alcohol (ethanol).

The untreated packaged tortillas and the tortillas sprayed with the yeast solution showed mold spots after 6 days while no mold spots appeared over a 15 day period in the bags were tortilla on top of the stack had been sprayed with the live yeast solution in which the sugar had been fermented.

The untreated packaged sponge cakes and the sponge cakes sprayed with the live yeast solution showed mold spots after 8 days while the cakes sprayed with the live yeast solution in which the sugar had been fermented showed no mold spots over a 3 week period.

The untreated cake muffins and the cake muffins sprayed with live yeast showed mold spots within 1 week while the muffins sprayed with a live yeast solution in which the sugar had been fermented were mold free for more than 3 weeks.

These results indicate that live yeast sprays are effective in increasing mold-free shelf life of chemically leavened baked goods like wheat flour tortillas, sponge cakes and cake muffins if the yeast solution contains fermented sugar (alcohol).

EXAMPLE 3

Bread was prepared using the process and recipe described in EXAMPLE 1 and sprayed with 5 ml of a solution of Eagle block yeast containing 0 gram, 0.01 gram, 0.1 gram, 1 gram, 10 gram or 20 gram of compressed yeast in 100 ml of water. Breads were sliced, packaged and evaluated for mold spots using the same procedure as described in EXAMPLE 1. Results are shown below in Table 2.

TABLE 2

Mold-free shelf life of baked goods coated with different yeast concentrations

| Recipe | Spray (Eagle block yeast) | Time for mold spots on >50% of loaves |
| --- | --- | --- |
| Control | none | 8-9 days |
| 0.5% Ca-propionate | none | 19 days |
| Control | 5 ml spray 0 gr/100 ml | 8-9 days |
| Control | 5 ml spray 0.01 gr/100 ml | 15 days |
| Control | 5 ml spray 0.1 gr/100 ml | 20 days |
| Control | 5 ml spray 1 gr/100 ml | 20-25 days |
| Control | 5 ml spray 10 gr/100 ml | 20-25 days |
| Control | 5 ml spray 20 gr/100 ml | 25 days |

The results in the table (Table 2) show that even low levels of live yeast are effective in increasing mold-free shelf life. Optimized results appear to be obtained by spraying 3-5 ml of a yeast solution containing 0.1-1 gram of yeast on the top of the loaf covering about 200 cm$^2$. One should note that yeast solutions of 0.1 gr/100 ml or greater had results that were superior to a 0.5% solution of Calcium propionate.

EXAMPLE 4

Breads were prepared using the process and recipe as described in EXAMPLE 1. Loaves were sprayed with 5 ml of a solution of 1 gram (approximately 10 billion CFU) of Eagle block yeast in 100 ml of ice cold water or with 3 ml of a solution of 10 gram Levucell SB (approximately 200 billion CFU) in 100 ml water using the procedure described in EXAMPLE 1. This resulted in loaves having 0.5 billion CFU/loaf and 6 billion CFU/loaf respectively. The breads were packaged in plastic bags and stored at room temperature, evaluated for mold growth and live yeast cells. A total of 10 cm$^2$ out of the 200 cm$^2$ of crust area that was covered by the spray was homogenized in sterile water and further dilutions in sterile water were made for enumerating the number of live yeast cells per loaf. Under sterile conditions 1 ml of the various dilutions from the crust area were plated on petri dishes containing YEP+chloramphenicol agar medium for enumeration of live yeast cells. The plates were incubated at 30 degrees Celsius and were enumerated after 2-3 days. The results are shown below in Table 3.

The results below show that only insignificant small numbers of live yeast cells could be detected on the loaves that were sprayed with water (<1 CFU/cm$^2$), while high levels could be detected on the loaves sprayed with live yeast cells. The number of live yeast cells on the loaves on day 1 was close to was close to the number of live yeast cells sprayed on the bread. There is approximately a 10 fold drop in live yeast cells counts during the first 3 days but not much of a further drop during subsequent storage of the breads.

When using the Levucell SB it is possible to attain about 1 billion CFU per serving of bread (50 grams) for this probiotic yeast strain. Surprisingly it was found that this fragile probiotic *Saccharomyces cerevisiae* var *bourlardii* yeast largely survived on the crust of the bread with almost no loss in CFU during application onto the bread and subsequent storage of the bread. Similar excellent survival rates of this probiotic yeast applied to bread were observed for both packaged and non-packaged bread.

TABLE 3

Live yeast cells on crust of treated baked goods.

| | CFU/loaf (200 cm$^2$) | | |
| --- | --- | --- | --- |
| storage time/initial concentration | 5 ml water 0 CFU per loaf | 5 ml of 1 gr/100 ml Eagle block yeast 0.5 billion CFU per loaf | 3 ml of 10 gr/100 ml Levucell SB 6 billion CFU per loaf |
| 1 day | <100 | 8.0E+08 | 8.0E+09 |
| 3 days | <100 | 9.0E+07 | |
| 5 days | <100 | 4.0E+07 | 4.0E+09 |
| 10 days | molded | 8.0E+07 | 3.0E+09 |
| 15 days | molded | 6.0E+07 | |
| 20 days | molded | 9.0E+07 | |

EXAMPLE 5

Bread was prepared using the process and recipe described in EXAMPLE 1. Breads were sliced, sprayed with live yeast and packaged in different ways and evaluated for mold spots using the same procedure as described in EXAMPLE 1. Some of the bags were analyzed for residual oxygen in the bag using a Mocon Pac Check™ Head Space Analyzer. Results are presented in Table 4 below:

TABLE 4

Effects of packaging on mold-free shelf life yeast treated baked goods.

| Recipe | Spray treatment | Packaging | Time for mold spots on >50% of loaves |
|---|---|---|---|
| Control | None | closed poly bag | 8 days |
| +0.5% Calpro | None | closed poly bag | 18 days |
| Control | 5 ml of 1 gr/100 ml | closed poly bag | 22-24 days |
| Control | 5 ml of 1 gr/100 ml | closed commercial poly bread bag # 1 | 22-24 days |
| Control | 5 ml of 1 gr/100 ml | closed commercial poly bread bag # 2 | 22-24 days |
| Control | 5 ml of 1 gr/100 ml | closed commercial poly bread bag # 3 | 22-24 days |
| Control | 5 ml of 1 gr/100 ml | covered by plastic | 8 days |
| Control | 5 ml of 1 gr/100 ml | poly bag not closed | 16 days |
| Control | 5 ml of 1 gr/100 ml | closed poly bag and repackaged into new bag every other 3 days | 22-24 -days |
| Control | 1 loaf 5 ml of 1 gr/100 ml 1 loaf not sprayed | 2 loaves in one closed poly bag 1 loaf treated 1 untreated | 23 days for both loaves |
| Control | ½ of loaf sprayed by 2 ml of 1 gr/100 ml | closed poly bag | 22-24 days |

The results shown in the Table 4 above indicate that packaging of the bread in a closed bag is important to obtain the extended mold-free shelf life, since packaging in an open bag or simply covering the bread by plastic will reduce the anti-molding effect of the live yeast spray considerably. The anti-molding effect of the live yeast spray is not dependant on completely covering the bread by the live yeast spray since only the top crust area was sprayed while the anti-molding effect was seen on all sides of the bread. Moreover by spraying only half of the bread or by packaging 2 breads in one bag of which one was untreated and the other was sprayed with live yeast, mold-free shelf life was increased for all parts of the same bread and for all breads in the same bag. This indicates that the anti-molding effect is distributed through the atmosphere of the closed bag.

Table 5 shows results for residual oxygen in the bag for control bread (no live yeast spray) and for bread sprayed with 5 ml of a 1 gram solution of 100 gram Eagle block yeast in 100 ml.

TABLE 5

Oxygen content of treated and untreated packaged bread

| | Oxygen content in closed bag (%) | |
|---|---|---|
| Storage time | Control bread | Sprayed bread |
| open air | 20.7% | |
| day 1 | 20.1% | 19.5% |
| day 2 | 20.3% | 19.6% |
| day 3 | 20.3% | 19.5% |
| day 4 | 20.3% | 19.3% |
| day 7 | 20.4% | 19.0% |
| day 8 | molded | 18.8% |
| day 9 | molded | 18.6% |
| day 10 | molded | 18.5% |
| day 15 | molded | 18.5% |
| day 20 | molded | 18.5% |

While the oxygen content in the bags containing the bread that was sprayed with live yeast showed lower residual oxygen content than in the bags containing bread that was not sprayed, the differences were small while the residual oxygen content was close to that in the open air. This indicates that either the live yeast is not able to consume much oxygen or that the poly bags are a poor barrier for oxygen. Separate experiments using Age-less™ oxygen absorber indicated that the normal poly bags used for packaging of bread are indeed poor barriers for oxygen. In any case, the oxygen content in the bags seems too high to explain the anti-molding effect by consumption of oxygen by the live yeast since residual oxygen contents around 1% are required for extending mold-free shelf life in Modified Atmosphere Packaging (MAP).

EXAMPLE 6

Breads were prepared using the process and recipes in EXAMPLE 1 using 0.5% calcium propionate in all breads and spraying some breads (Test) with 5 ml of a live yeast solution (1 gram EAGLE block yeast in 100 ml of water) while other breads (Control) were not sprayed before packaging into closed plastic bags. Head space GC was used to asses the composition of the volatiles and changes in these volatiles during storage of these breads in closed bags, while the fermentation flavor of the breads was compared over the storage period by a trained panel. Acetaldehyde in bread was determined by using a Megazyme test kit or by GC-MS. The results of head space GC are summarized in next table (Table 6):

The bread flavor description in Table 6 represents a description of the intensity of the flavor, such as fermentation flavor, of the bread crumb by 1 or 2 persons over time. In a further triangular test, an untrained taste panel of 15 people was able to notice a difference in flavor between Control and Test bread after 7 days storage at ambient temperature. Results showed highly significant difference with almost all panelists able to notice a difference in flavor that was usually described as "bland, lacking flavor" for the Control bread and "fresh fermentation flavor" for the Test breads. Thus, the results of the triangular test confirm the results shown in Table 6.

Results in the table (Table 6) indicate that the Control breads lost most of their fresh fermentation flavor, while the Test breads maintained an attractive fresh fermentation flavor over a 23 day storage period. The loss of fermentation flavor in the Control bread was also indicated by head space GC showing that the levels isoamyl alcohol and isobutyl alcohol for the Control breads diminished over the storage period, while these levels were constant or slightly increasing for the Test breads that have been sprayed with live yeast. Similar results were seen for acetaldehyde using a Megazyme test kit and GC-MS, showing that acetaldehyde levels were 20 x higher in the Test breads than in the Control breads. Ethanol levels in the bread crumb (determined by HPLC in aqueous extracts of bread crumb) showed that the ethanol levels in the Test bread stayed constant around 0.4% while the level in the Control breads diminished gradually by more than half over a 23 days storage period. These ethanol levels in the Test breads are much lower than the 0.8-1.5% levels mentioned in U.S. Pat. No. 7,198,810.

TABLE 6

Volatiles and Taste Comparison of treated and untreated bread

| Storage time | Recipe | Relative changes in content of head space volatiles | | | Bread flavor description |
| --- | --- | --- | --- | --- | --- |
| | | ethanol | isoamyl alcohol | isobutyl alcohol | |
| day 1 | Control | 100% | 100% | 100% | fresh fermentation flavor |
| | Test | 105% | 130% | 125% | fresh fermentation flavor |
| day 4 | Control | 90% | 85% | 83% | slightly reduced flavor |
| | Test | 110% | 150% | 165% | fresh fermentation flavor |
| day 8 | Control | 85% | 63% | 75% | some fermentation flavor |
| | Test | 105% | 140% | 163% | fresh fermentation flavor |
| day 13 | Control | 61% | 44% | 67% | low fermentation flavor |
| | Test | 110% | 135% | 155% | fresh fermentation flavor |
| day 19 | Control | 52% | 27% | 49% | bland fermentation flavor |
| | Test | 115% | 120% | 149% | fresh fermentation flavor |
| day 23 | Control | 30% | 13% | 45% | very bland flavor/no flavor |
| | Test | 100% | 99% | 153% | freshly fermented flavor |

Control bread standard recipe + 0.5% Ca-propionate
Test bread standard recipe + 0.5% Ca-propionate sprayed with 5 ml of 1 gram Eagle block yeast in 100 ml Isoamyl alcohol, isobutyl alcohol, acetaldehyde and to a lesser extent ethanol are considered to be the main components of fermentation flavor in freshly baked bread with levels in freshly baked bread of 3900 mg/kg bread for ethanol, 27.4 mg/kg bread for isoamyl alcohol and 11.3 mg/kg of bread for isobutyl alcohol and 4.3 mg/kg for acetaldehyde (see Maarse, 1991 in Volatile compounds in Foods and Beverages, CRC Press). These results suggest that the loss of volatile compounds in bread during storage through the closed plastic bags that have poor barrier properties for these compounds causes the loss of fermentation flavor, while the spraying with live yeast will counteract this loss. It is also suggested that the anti-molding effect of a live yeast spray applied after baking is related to the production of one or more of these volatile compounds.

EXAMPLE 7

Breads without calcium propionate were prepared as in Example 1 to compare various methods for post-baking application of live yeast. The control bread without application of live yeast molded after 8-9 days, while the breads that were sprayed with 5 ml of a 1 gram /100 cc solution of compressed yeast showed mold spots only after 25 days of ambient storage. When the same amount of live yeast was injected into the bread (10×0.5 ml of a 1 gram/100 cc solution applied in 10 different spots using a small syringe) the mold-free shelf life was also 25 days. When the same amount of live yeast solution (5 ml of 1 gram/100 cc) was sprayed on the inside of the plastic bag used for packaging the bread, the mold-free shelf life was 20 days, indicating that the contact between the treated plastic bag and the bread was sufficient to obtain an anti-molding effect. When instant dry yeast was ground into a fine powder and applied onto the surface of the bread, using a brush, the mold-free shelf life of the packaged bread was about 17 days. When using 0.5 gram of the same ground instant dry yeast powder to treat the inside of the bag (the finely ground yeast powder was adsorbed onto the surface of the plastic bag and excess yeast was removed) the mold-free shelf life was about 14 days. When a slice of bread (28 grams) was sprayed with 1 ml of a 10 gram/cc solution of live compressed yeast, and this slice was wrapped into cheese cloth and placed inside the plastic bag containing a sliced loaf of untreated bread, the mold-free shelf life was about 20 days. When 20 grams bread crumb of this treated bread slice was crumbled and put into the plastic bag containing an untreated sliced loaf, the mold-free shelf life was about 20 days. All these results show that alternative methods for post baking application of live yeast either as a yeast solution or as finely ground dry yeast powder onto the surface or into the interior of the bread or onto the surface of the plastic bag that is in contact with the surface of the packaged bread are effective in increasing its mold-free shelf life.

EXAMPLE 8

Breads were prepared using the process and recipe described in EXAMPLE 1 to test the mold inhibiting effect of acetaldehyde, one of the components found at elevated levels in bread sprayed with live yeast (see EXAMPLE 6). Since acetaldehyde is very volatile but water soluble it was applied onto the bread crust as a 1% or 10% solution in water while the bread was immediately packaged into plastic bags thereafter. Some of the bags were fitted into airtight closed plastic containers. The breads were stored at room temperature (22 degrees Celsius) and evaluated for mold growth over a 4 week period.

TABLE 7

Effect of packaging on mold-free shelf life of bread treated with acetaldehyde

| Recipe | Time for mold spots on >50% of loaves |
| --- | --- |
| Control | 7-8 days |
| 0.5% Ca-propionate | 19 days |
| 50 ppm acetaldehyde in closed airtight container | 11 days |
| 100 ppm acetaldehyde in closed airtight container | 15 days |
| 200 ppm acetaldehyde in closed airtight container | 24 days |
| 200 ppm acetaldehyde in closed plastic bag | 7-8 days |
| 500 ppm acetaldehyde in closed plastic bag | 8 days |
| 1500 ppm acetaldehyde in closed plastic bag | 8 days |

1 ppm acetaldehyde = 1 mg per kg of bread applied on crust area before packaging The results confirm that acetaldehyde has a strong mold inhibiting effect but only if the closed bread bags are stored in a closed airtight container, but not when kept in a closed plastic bag. These results show that a normal plastic bread bag is not a good barrier for acetaldehyde and explains why a closed container is required to obtain an increase in mold-free shelf life. Yeast is able to gradually convert alcohol normally present in baked bread into acetaldehyde if oxygen is present and this could explain the increase in mold-free shelf live when bread is sprayed with live yeast after baking and packaged in plastic bags that are not a perfect barrier for acetaldehyde.

EXAMPLE 9

Various commercially available food and feed products were packaged into plastic bags and stored at ambient temperature to follow mold growth over time. Some of the products were packaged as such, some were sprayed with a solution of 2.5% live yeast (about 1 ml per 100 gram of product) and some were sprayed with a solution of live yeast (about 1 ml per 100 gram product) obtained by incubating a solution of 2.5% yeast and 20% sugar for 24 hours at 30 degrees Celsius to convert the major part of the sugar into alcohol. The incubation for 24 hours at 30 degrees C. converted substantially all the sugar in the solution into ethanol. The 20% sugar solution was therefore converted into 10% ethanol and the spray thus contained about 10% (w/w) ethanol.

TABLE 8

Mold-free shelf life of various food and feed products

| Food or feed product | Treatment | Time for mold spots on >50% of food or feed products |
|---|---|---|
| white bread (not sliced) | none | 11 days |
| white bread (not sliced) | live yeast spray | 23 days |
| white bread (not sliced) | live yeast/alcohol spray | 25 days |
| Sponge cake | none | 20 days |
| Sponge cake | live yeast spray | 21 days |
| Sponge cake | live yeast/alcohol spray | 35 days |
| Shredded cheddar Cheese | none | 8 days |
| Shredded cheddar Cheese | live yeast spray | 8 days |
| Shredded cheddar Cheese | live yeast/alcohol spray | 19 days |
| Shredded mozzarella cheese | none | 6 days |
| Shredded mozzarella cheese | live yeast spray | 7 days |
| Shredded mozzarella cheese | live yeast/alcohol spray | 12 days |
| Ground corn/wheat silage | none | 19 days |
| Ground corn/wheat silage | live yeast spray | 17 days |
| Ground corn/wheat silage | live yeast/alcohol spray | 24 days |

The results indicate that mold-free shelf life of all tested food and feed products is improved by spraying with a solution of live yeast in which the sugar has been fermented into alcohol (ethanol) while spraying with live yeast is not effective except for bread. Since bread is a fermented product that contains alcohol (about 0.4% ethanol) it is concluded that the ethanol is a key ingredient to obtain an anti-molding effect from spraying with a live yeast solution. However the levels of ethanol introduced are too small to have an anti-molding effect per se, so it is suggested that the ethanol is converted by live yeast in the presence of oxygen into acetaldehyde which is 20-100× more effective as a mold inhibitor. Thus live yeast in the presence of oxygen and ethanol acts as an acetaldehyde generating system that inhibits mold growth when applied to various food or feed products.

What is claimed is:

1. A process for producing a baked good comprising the steps of:
   a) baking said baked good and cooling said baked good to a temperature sufficiently low for yeast to survive;
   b) applying live yeast to said baked good after baking in an amount sufficient to extend the mold-free shelf life of said baked good as compared to an untreated baked good;
   c) packaging and storing said baked good in a closed bag.

2. A process for producing a baked good comprising the steps of:
   a) baking said baked good and cooling said baked good to a temperature sufficiently low for yeast to survive;
   b) applying live yeast to said baked good after baking in an amount sufficient to improve the flavor of said baked good as compared to an untreated baked good;
   c) packaging and storing said baked good in a closed bag.

3. A process according to claim 1 or claim 2 wherein said baked good is baked in an oven or fried in a fryer.

4. A process according to claim 1 or claim 2 wherein said baked good is yeast raised or chemically leavened.

5. A process according to claim 1 or claim 2 wherein said baked good is selected from the group consisting of: bread, rolls, pita bread, donuts, croissants, tortillas, bagels and pizza crusts.

6. A process according to claim 1 or claim 2 further including the step of slicing said baked good prior to packaging.

7. A process according to claim 1 or claim 2 wherein said baked good contains a mold-inhibiting agent is selected from the group consisting of: propionate, sorbate, benzoate, paraben, and cultured bacteria compounds.

8. A process for producing a baked good comprising the steps of:
   a) baking said baked good and cooling said baked good to a temperature sufficiently low for yeast to survive;
   b) applying live yeast to said baked good after baking by a step selected from the group consisting of: spraying or brushing a yeast solution on the surface of said baked good, brushing dry yeast onto the surface of said baked good, adsorbing of dry yeast or a liquid yeast solution into or onto the closed bag that comes into contact with the baked good after packaging, injecting of a yeast solution into the baked good;
   c) packaging and store said baked good in a closed bag.

9. A process according to claim 1 or 2 wherein the live yeast material is contained in a separate carrier or support that is included in the closed bag used for packaging the baked good.

10. A process according to claim 1 or claim 2 wherein the live yeast is applied as part of an egg-wash, a chocolate filling or covering, a jelly or cream filling, or covering that is applied to said baked good after baking.

11. A process according to claim 7 wherein the live yeast is applied to said baked good preferably as a yeast solution containing 0.01-20 grams of live yeast per 100 ml.

12. A process according to claim 11 wherein the yeast solution is used in quantities varying from 0.5 to 10 ml per 100 cm$^2$.

13. A process according to claim 11 wherein the yeast solution contains 0.1-1 gram of live yeast per 100 ml.

14. A process according to claim 11 wherein the yeast solution is used in quantities varying from 1.5 to 2.5 ml per 100 cm$^2$.

15. A process according to claim 7 wherein the live yeast includes yeast strains of the genus *Saccharomyces*.

16. A process according to claim 1 or claim 2 wherein said baked good is packaged in a polyethylene plastic bag.

17. A process according to claim 1 or claim 2 wherein said baked good is stored at ambient temperature.

18. A process for extending the mold-free shelf life of a food or feed product comprising the steps of:
   a) a heat treatment of said food or feed product as a means to kill substantially all vegetative microbial cells in said food or feed product;
   b) applying live yeast to said food or feed product;
   c) packaging and storing said food or feed product in an enclosure.

19. A baked good prepared by applying live yeast after baking containing *Saccharomyces cerevisiae* var *boulardii* in quantities less than 1 billion CFU per 50 gram of said baked good.

20. A baked good according to claim 19 wherein said live yeast is applied in quantities between 1 million and 1 billion CFU per 50 gram of said baked good.

21. A baked good prepared by applying live yeast on the surface of said baked good after baking as a means to improve mold-free shelf life of said baked good, packaging said baked good in a closed bag and storing said baked good at ambient temperature.

22. A baked good prepared by applying live yeast on the surface of said baked good after baking as a means to improve flavor of said baked good, packaging said baked good in a closed bag and storing said baked good at ambient temperature.

23. A baked good prepared by applying more than 1 CFU of yeast per $cm^2$ on the surface of said baked good after baking as a means to improve mold-free shelf life of said baked food packaging said baked good in a closed bag and storing said baked good at ambient temperature.

24. A baked good according to claim 23 wherein between 50 CFU and 200 million CFU of yeast per $cm^2$ is applied on the surface of said baked good.

25. A baked good according to claim 23 wherein between 500 and 200 million CFU of yeast per $cm^2$ is applied on the surface of said baked good.

26. A baked good according to claim 23 wherein between 150,000 CFU and 2.5 million CFU of yeast per $cm^2$ is applied on the surface of said baked good.

27. A baked good according to claim 21 or claim 22 wherein at least 1 CFU of live yeast per $cm^2$ can be detected on the surface of said baked good.

28. A baked good according to claim 27 wherein between 500 CFU and 2 billion CFU of live yeast per $cm^2$ can be detected on the surface of said baked good.

29. A baked good according to claim 27 wherein between 5000 CFU and 200 million CFU of live yeast per $cm^2$ can be detected on the surface of said baked good.

30. A baked good according to claim 27 wherein between 15,000 CFU and 2.5 million CFU of live yeast per $cm^2$ can be detected on the surface of said baked good.

31. A baked good according to claim 27 wherein between 150,000 CFU and 2.5 million CFU of live yeast per $cm^2$ can be detected on the surface of said baked good.

32. A baked good according to claim 21 or claim 22 wherein an amount between 5 nanogram and 20 mg of live yeast per $cm^2$ is applied to the surface of said baked good.

33. A baked good according to claim 32 wherein an amount between 0.5 microgram and 20 mg of live yeast per $cm^2$ is applied to the surface of said baked good.

34. A baked good according to claim 32 wherein an amount between 15 microgram and 0.25 mg of live yeast per $cm^2$ is applied to the surface of said baked good.

35. A baked good according to claim 21 or claim 22 wherein elevated levels of volatile compounds are present after 1 week of storage at room temperature.

36. A baked good according to claim 35 wherein ethanol is present at levels between 0.3 and 0.8% by weight of said baked good.

37. A baked good according to claim 35 wherein isoamyl alcohol is present at levels above 25 mg per kg of said baked good.

38. A baked good according to claim 35 wherein isobutyl alcohol is present at levels above 10 mg per kg of said baked good.

39. A baked good according to claim 35 wherein acetaldehyde is present at levels above 5 mg per kg of baked good.

40. A baked good with improved mold free shelf life as compared to and untreated baked good wherein at least 1 CFU of live yeast per $cm^2$ can be detected on the surface of said baked good.

41. A baked good according to claim 40 wherein between 500 CFU and 2 billion CFU of live yeast per $cm^2$ can be detected on the surface of said baked good.

42. A baked good according to claim 40 wherein between 5000 CFU and 200 million CFU of live yeast per $cm^2$ can be detected on the surface of said baked good.

43. A baked good according to claim 40 wherein between 15,000 CFU and 2.5 million CFU of live yeast per $cm^2$ can be detected on the surface of said baked good.

44. A baked good according to claim 40 wherein between 150,000 CFU and 2.5 million CFU of live yeast per $cm^2$ can be detected on the surface of said baked good.

45. A baked good with improved flavor as compared to an untreated baked good wherein on the surface of said baked good at least 1 CFU of live yeast per $cm^2$ can be detected on the surface of said baked good.

46. A baked good according to claim 45 wherein between 500 CFU and 2 billion CFU of live yeast per $cm^2$ can be detected on the surface of said baked good.

47. A baked good according to claim 45 wherein 5000 CFU and 200 million CFU of live yeast per $cm^2$ can be detected on the surface of said baked good.

48. A baked good according to claim 45 wherein between 15,000 CFU and 2.5 million CFU of live yeast per $cm^2$ can be detected on the surface of said baked good.

49. A baked good according to claim 45 wherein between 150,000 CFU and 2.5 million CFU of live yeast per $cm^2$ can be detected on the surface of said baked good.

50. A process for producing a food or feed product with extended mold-free shelf-life comprising the steps of:
    (a) preparing a solution of live yeast and sugar and fermenting a substantial part of the sugar into ethanol;
    (b) applying said fermented live yeast solution to said food or feed product;
    (c) packaging and storing said food or feed product in an enclosure.

51. A process according to claim 50 wherein the live yeast solution contains between 1% and 10% by weight of yeast and between 10% and 20% by weight of sugar and is applied after fermentation.

52. A process according to claim 51 wherein the live yeast solution is applied on the food or feed product in quantities between 0.1% and 10% by weight of the food or feed product.

53. A process according to claim 51 wherein the live yeast solution contains about 10% by weight of ethanol.

54. A composition for extending mold-free shelf life of a baked good comprising:
    live yeast, wherein the composition is a solution and is applied on the surface of the baked good.

55. A composition for extending mold-free shelf life of a baked good comprising:
    (a) live yeast, and
    (b) ethanol,
    wherein the composition is a solution and is applied on the surface of the baked good.

56. A composition according to claim 54 or claim 55 wherein the composition contains between 1% and 10% by weight of yeast.

57. A composition according to claim 54 or claim 55 wherein the composition contains about 10% by weight of ethanol.

58. A composition according to claim 54 or claim 55 wherein the composition is applied on the baked good in quantities between 0.1% and 10% by weight of the baked good.

* * * * *